(12) United States Patent
Wang et al.

(10) Patent No.: US 11,574,135 B2
(45) Date of Patent: Feb. 7, 2023

(54) METHOD, APPARATUS, ELECTRONIC DEVICE AND READABLE STORAGE MEDIUM FOR TRANSLATION (71) Applicant: BEIJING BAIDU NETCOM SCIENCE AND TECHNOLOGY CO., LTD., Beijing (CN)

(72) Inventors: Haifeng Wang, Beijing (CN); Hua Wu, Beijing (CN); Zhongjun He, Beijing (CN); Hao Xiong, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 282 days.

(21) Appl. No.: 16/861,750

(22) Filed: Apr. 29, 2020

(65) Prior Publication Data
US 2021/0192151 A1    Jun. 24, 2021

(30) Foreign Application Priority Data

Dec. 19, 2019  (CN) .......................... 201911313715.1

(51) Int. Cl.
*G06F 40/58* (2020.01)
*G06F 40/51* (2020.01)
*G06F 40/49* (2020.01)

(52) U.S. Cl.
CPC .............. *G06F 40/58* (2020.01); *G06F 40/49* (2020.01); *G06F 40/51* (2020.01)

(58) Field of Classification Search
CPC .... G06F 40/40–58; G06F 40/10; G06F 40/20; G06F 40/237; G06F 40/242;

(Continued)

(56) References Cited

U.S. PATENT DOCUMENTS 6,996,520 B2\*  2/2006  Levin ................. G10L 15/1822
                                                704/10
2010/0185670 A1\*  7/2010  Krishnan ............ G06F 16/3335
                                                704/8

(Continued)

FOREIGN PATENT DOCUMENTS

CN          106250375 A       12/2016
CN          109871546 A        6/2019

(Continued)

OTHER PUBLICATIONS

Wang et al., "Domain-specific machine translation with recurrent neural network for software localization", Empirical Software Engineering, Apr. 30, 2019.

(Continued)

*Primary Examiner* — Jonathan C Kim
(74) *Attorney, Agent, or Firm* — Ladas & Parry, LLP (57) ABSTRACT

The present disclosure provides a method, apparatus, electronic device and readable storage medium for translation and relates to translation technologies. In the embodiments of the present disclosure, the at least one knowledge element is obtained according to associated information of content to be translated, and respective knowledge element in the at least one knowledge element comprise an element of the first language type and an element of the second language type so that the at least one knowledge element can be used to obtain a translation result of the content to be translated. Since the at least one knowledge element obtained in advance is taken as global information of the translation task of this time, it can be ensured that the translation result of the same content to be translated is consistent, thereby improving the quality of the translation result.

14 Claims, 4 Drawing Sheets

(58) Field of Classification Search
CPC .... G06F 40/247; G06F 40/279; G06F 40/289; G06N 3/02; G06N 3/08; G10L 15/00–24
See application file for complete search history.

(56) References Cited

U.S. PATENT DOCUMENTS

| | | | |
|---|---|---|---|
| 2010/0241416 A1* | 9/2010 | Jiang | G06F 40/45 704/7 |
| 2011/0040552 A1* | 2/2011 | Van Guilder | G06F 40/40 704/4 |
| 2011/0307241 A1* | 12/2011 | Waibel | G06F 40/44 704/2 |
| 2013/0006613 A1 | 1/2013 | Karov Zangvil et al. | |
| 2013/0226556 A1 | 8/2013 | Hwang et al. | |
| 2013/0246042 A1* | 9/2013 | Hagiwara | G06F 40/129 704/2 |
| 2014/0163952 A1* | 6/2014 | Brawer | G06F 40/129 704/5 |
| 2017/0242847 A1 | 8/2017 | Li et al. | |
| 2017/0371867 A1* | 12/2017 | Hughes | G06F 40/51 |
| 2018/0011842 A1* | 1/2018 | Waibel | G10L 15/06 |
| 2018/0262460 A1* | 9/2018 | Daryani | G06F 40/157 |
| 2021/0209313 A1* | 7/2021 | Li | G06F 40/289 |

FOREIGN PATENT DOCUMENTS

| | | | |
|---|---|---|---|
| CN | 109871548 A | | 6/2019 |
| CN | 111539229 A | * | 8/2020 |
| EP | 2833269 A2 | | 4/2015 |
| EP | 2833269 A3 | | 7/2015 |
| JP | H08-185407 A | | 7/1996 |
| JP | H0997256 A | | 4/1997 |
| JP | 3429612 B2 | * | 7/2003 |
| JP | 2013519131 A | | 5/2013 |
| JP | 2015022431 A | | 2/2015 |
| JP | 2016524234 A | | 8/2016 |
| JP | 2016177341 A | | 10/2016 |
| KR | 20120048104 A | | 5/2012 |
| TW | 200705223 A | | 2/2007 |
| TW | 201220088 A | | 5/2012 |
| WO | 2006133571 A1 | | 12/2006 |
| WO | 2014/130132 A2 | | 8/2014 |
| WO | 2014/130132 A3 | | 8/2014 |

OTHER PUBLICATIONS

Rodrigues et al., "Domain-Specific Hybrid Machine Translation from English to Portuguese", Big Data Analytics in the Social and Ubiquitous Context: 5th International Workshop on Modeling Social Media, MSM 2014, 5$^{th}$ International Workshop on Mining Ubiquitous and Social Environments, Muse 2014 and First International Workshop on Machine Le, Jun. 21, 2016.

Arcan et al., "Translating Domain-Specific Expressions in Knowledge Bases with Neural Machine Translation", Insight Centre for Data Analytics, National University of Ireland Galway, Sep. 7, 2017.

Itagaki et al., "Post-MT Term Swapper: Supplementing a Statistical Machine Translation System with a User Dictionary", LREC 2008, May 28, 2008, pp. 1584-1588.

Extended European Search Report from EP app. No. 20173559.4, dated Feb. 11, 2020.

Notice of Reason for Refusal from JP app. No. 2020-092008, dated Jul. 27, 2021, with English translation from Global Dossier.

Notification of Reason for Refusal from KR app. No. 10-2020-0068049, dated Aug. 16, 2021, with English translation from Global Dossier.

Search Report for Chinese application No. 2019113137151, dated Jan. 22, 2020 with English translation provided by Google Translate.

First Office Action Issued in Chinese application No. 2019113137151, dated Jul. 26, 2019 with English translation provided by Google Translate.

Second Office Action issued in Chinese application No. 2019113137151, dated Mar. 19, 2020 with English translation provided by Google Translate.

Notice of Allowance for Chinese application No. 2019113137151, dated Apr. 1, 2020 with English translation provided by Google Translate.

Hokamp et al., "Lexically Constrained Decoding for Sequence Generation Using Grid Beam Search", *Proceedings of the 55$^{th}$ Annual Meeting of the Association for Computational Linguistics*, Vancouver, Canada, Jul. 30-Aug. 4, 2017, pp. 1535-1546.

Communication Pursuant to Article 94(3) EPC from EP app. No. 20173559.4, dated Jan. 17, 2022, all pages.

Office action from Korean Patent Application No. 10-2020-0068049 dated Apr. 27, 2022, and its English translation.

* cited by examiner

METHOD, APPARATUS, ELECTRONIC DEVICE AND READABLE STORAGE MEDIUM FOR TRANSLATION

The present application claims the priority of Chinese Patent Application No. 201911313715.1, filed on Dec. 19, 2019, with the title of "Method, apparatus, electronic device and readable storage medium for translation". The disclosure of the above applications is incorporated herein by reference in its entirety.

FIELD OF THE DISCLOSURE

The present disclosure relates to computer technologies, specifically to translation technologies, and particularly to a method, apparatus, electronic device and readable storage medium for translation.

BACKGROUND OF THE DISCLOSURE

Conventional machine translation performs translation processing by taking sentences as translation units.

Since sentences are taken as translation units for translation processing so that sentences are independent from one another, it might occur that the translation result of the same content to be translated is inconsistent, thereby reducing intelligibility of the translation result.

SUMMARY OF THE DISCLOSURE

A plurality of aspects of the present disclosure provide a method, apparatus, electronic device and readable storage medium for translation, to improve the quality of the translation result.

In an aspect, the present disclosure provides a translation method, comprising:

obtaining at least one knowledge-element according to associated information of content to be translated, a knowledge-element in the at least one knowledge-element comprising an element of a first language type and an element of a second language type, wherein the element of the second language type is an element in a plurality of elements of the second language type corresponding to the element of the first language type;

using the at least one knowledge-element to obtain a translation result of the content to be translated.

The above aspect and any possible implementation further provide an implementation: the associated information of the content to be translated includes at least one of the following information:

a language type corresponding to the content to be translated, and a language type corresponding to the translation result of the content to be translated;

title information of the content to be translated;
author information of the content to be translated; and
field information of the content to be translated.

The above aspect and any possible implementation further provide an implementation: the obtaining at least one knowledge-element according to associated information of content to be translated comprises:

obtaining the associated information of the content to be translated;

obtaining a search result according to the associated information of the content to be translated; and performing information extraction processing for the search result to obtain the at least one knowledge-element.

The above aspect and any possible implementation further provide an implementation: the knowledge-element further comprises a flag for indicating the language type included by the knowledge-element.

The above aspect and any possible implementation further provide an implementation: the using of the at least one knowledge-element to obtain a translation result of the content to be translated comprises:

using the at least one knowledge-element to perform limited decoding processing for the content to be translated, to obtain the translation result of the content to be translated.

The above aspect and any possible implementation further provide an implementation: the using of the at least one knowledge-element to perform limited decoding processing for the content to be translated, to obtain the translation result of the content to be translated comprises:

replacing a portion which is in the content to be translated and matches the element of the first language type in the at least one knowledge-element with a special character to obtain converted content;

obtaining a translation result of the converted content; and restoring the special character in the translation result of the converted content to the element of the second language type corresponding to the special character, to obtain the translation result of the content to be translated.

The above aspect and any possible implementation further provide an implementation: the using of the at least one knowledge-element to perform limited decoding processing for the content to be translated, to obtain the translation result of the content to be translated comprises:

adding the at least one knowledge-element to a translation model to train the translation model; and using the translation model to obtain the translation result of the content to be translated.

The above aspect and any possible implementation further provide an implementation: the using of the at least one knowledge-element to perform limited decoding processing for the content to be translated, to obtain the translation result of the content to be translated comprises:

taking the at least one knowledge-element as newly-added training data of the translation model to train the translation model;

using the translation model to obtain the translation result of the content to be translated.

The above aspect and any possible implementation further provide an implementation: the content to be translated comprises at least one of text input element and a speech recognition result.

The above aspect and any possible implementation further provide an implementation: before using the at least one knowledge-element to obtain a translation result of the content to be translated, the method further comprises:

using the at least one knowledge-element to modify the content to be translated.

The above aspect and any possible implementation further provide an implementation: the using of the at least one knowledge-element to modify the content to be translated comprises:

replacing a portion which is in the content to be translated and matches the element of the first language type in the at least one knowledge-element with the element of the first language type, to obtain correct content to be translated.

In another aspect, the present disclosure provides a translation apparatus, comprising:

a preparation unit configured to obtain at least one knowledge-element according to associated information of content to be translated, a knowledge-element in the at least one knowledge-element comprising an element of a first language type and an element of a second language type, wherein the element of the second language type is an element in a plurality of elements of the second language type corresponding to the element of the first language type;

a translation unit configured to use the at least one knowledge-element to obtain a translation result of the content to be translated.

The above aspect and any possible implementation further provide an implementation: the associated information of the content to be translated includes at least one of the following information:

a language type corresponding to the content to be translated, and a language type corresponding to the translation result of the content to be translated;

title information of the content to be translated;

author information of the content to be translated; and field information of the content to be translated.

The above aspect and any possible implementation further provide an implementation: the preparation unit is specifically configured to obtain the associated information of the content to be translated;

obtain a search result according to the associated information of the content to be translated; and perform information extraction processing for the search result to obtain the at least one knowledge-element.

The above aspect and any possible implementation further provide an implementation: the knowledge-element further comprises a flag for indicating the language type included by the knowledge-element.

The above aspect and any possible implementation further provide an implementation: the translation unit is specifically configured to use the at least one knowledge-element to perform limited decoding processing for the content to be translated, to obtain the translation result of the content to be translated.

The above aspect and any possible implementation further provide an implementation: the translation unit is specifically configured to replace a portion which is in the content to be translated and matches the element of the first language type in the at least one knowledge-element with a special character to obtain converted content;

obtain a translation result of the converted content; and restore the special character in the translation result of the converted content to the element of the second language type corresponding to the special character, to obtain the translation result of the content to be translated.

The above aspect and any possible implementation further provide an implementation: the translation unit is specifically configured to add the at least one knowledge-element to a translation model to train the translation model; and use the translation model to obtain the translation result of the content to be translated.

The above aspect and any possible implementation further provide an implementation: the translation unit is specifically configured to take the at least one knowledge-element as newly-added training data of the translation model to train the translation model;

use the translation model to obtain the translation result of the content to be translated.

The above aspect and any possible implementation further provide an implementation: the content to be translated comprises at least one of text input element and a speech recognition result.

The above aspect and any possible implementation further provide an implementation: the translation unit is further configured to use the at least one knowledge-element to modify the content to be translated.

In a further aspect, the present disclosure provides an electronic device, comprising:

at least one processor; and a memory communicatively connected with the at least one processor; wherein, the memory stores instructions executable by the at least one processor, and the instructions are executed by the at least one processor to enable the at least one processor to perform the method according to above aspect and any possible implementation.

In a further aspect, the present disclosure provides a non-transitory computer-readable storage medium storing computer instructions therein, wherein the computer instructions are used to cause the computer to perform the method according to above aspect and any possible implementation.

As known from the above technical solutions, in the embodiments, the at least one knowledge-element is obtained according to associated information of content to be translated, and the knowledge-element in the at least one knowledge-element comprises element of the first language type and element of the second language type so that the at least one knowledge-element can be used to obtain a translation result of the content to be translated. Since the at least one knowledge-element obtained in advance is taken as global information of the translation task of this time, it can be ensured that the translation result of the same content to be translated is consistent, thereby improving the quality of the translation result.

In addition, according to the technical solution provided by the present disclosure, at least one of the language type corresponding to the content to be translated and the language type corresponding to the translation result of the content to be translated, title information, author information and field information of the content to be translated, as the associated information of the content to be translated, is regarded as the basis for building the global information of the translation task of this time, so that the built global information can more thoroughly assist the translation task of this time and the reliability of the translation result can be effectively improved.

In addition, according to the technical solution provided by the present disclosure, it is possible to, by allowing the knowledge-element to further include a flag for indicating the language type included by the knowledge-element, make it possible to indicate whether the knowledge-element includes bilingual element, and effectively improve the use efficiency of the knowledge-element.

In addition, according to the technical solution provided by the present disclosure, it is possible to, by using the at least one knowledge-element to perform limited decoding processing for the content to be translated, obtain the translation result of the content to be translated, operate simply and effectively improve the translation efficiency.

In addition, according to the technical solution provided by the present disclosure, the at least one knowledge-element is used to train the translation model, and then the translation model may be used to obtain the translation result of the content to be translated. Since the global information of the translation task of this time is introduced into the translation model, the built translation model can accurately complete output of the specific element of the translation task of this time, thereby further improving the reliability of the translation result.

In addition, according to the technical solution provided by the present disclosure, it is possible, by using the at least one knowledge-element to modify the content to be translated, particularly in the speech translation scenario in which the speech recognition result is regarded as the content to be translated, modify the wrong speech recognition result in time before translation, and thereby obtain the correct translation result, and effectively improve the reliability of the translation result.

In addition, the user's experience can be effectively improved according to the technical solution provided by the present disclosure.

Other effects of the above aspects or possible implementations will be described hereunder in conjunction with specific embodiments.

BRIEF DESCRIPTION OF DRAWINGS

In order to more clearly illustrate the technical solutions in the embodiments of the present disclosure, figures to be used for describing the embodiments or the prior art will be briefly introduced below. Obviously, the figures described below illustrate some embodiments of the present disclosure. Those having ordinary skilled in the art appreciate that other figures may be obtained according to these figures without making any inventive efforts. The figures are only used to facilitate better understanding of the technical solutions and cannot be construed as limiting the present disclosure. In the figures.

DETAILED DESCRIPTION OF PREFERRED EMBODIMENTS

Exemplary embodiments of the present disclosure are described below with reference to the accompanying drawings, include various details of the embodiments of the present disclosure to facilitate understanding, and should be considered as merely exemplary. Therefore, those having ordinary skill in the art should recognize that various changes and modifications can be made to the embodiments described herein without departing from the scope and spirit of the application. Also, for the sake of clarity and conciseness, depictions of well-known functions and structures are omitted in the following description.

Apparently, embodiments described here are only partial embodiments of the present disclosure, not all embodiments. Based on embodiments in the present disclosure, all other embodiments obtained by those having ordinary skill in the art without making inventive efforts all fall within the protection scope of the present disclosure.

It needs to be appreciated that the terminal involved in the embodiments of the present disclosure comprises but is not limited to a mobile phone, a Personal Digital Assistant (PDA), a wireless handheld device, a Tablet Computer, a Personal Computer (PC), a MP3 player, a MP4 player, a wearable device (e.g., smart glasses, a smart watch, a smart bracelet, etc.), a smart home device (e.g., a smart speaker device, a smart TV set, a smart air conditioner, etc.), etc.

In addition, it should be appreciated that the term "and/or" used in the text herein is only an association relationship depicting associated objects and represents that three relations might exist, for example, A and/or B may represents three cases, namely, A exists individually, both A and B coexist, and B exists individually. In addition, the symbol "/" in the text generally indicates that associated objects before and after the symbol are in an "or" relationship.

Figure 1:
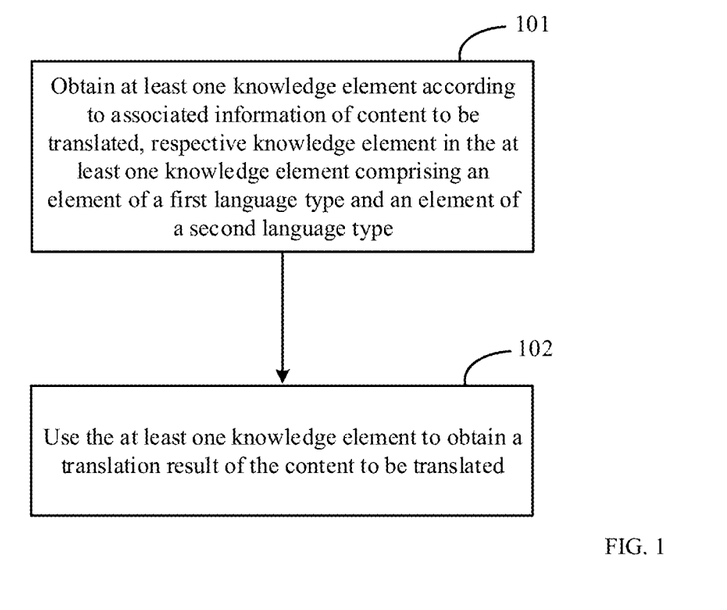
FIG. 1 is a flowchart of a translation method according to an embodiment of the present disclosure.

FIG. 1 is a flowchart of a translation method according to an embodiment of the present disclosure. As shown in FIG. 1, the method comprise the following steps:

101: obtaining at least one knowledge-element according to associated information of content to be translated, a knowledge-element in the at least one knowledge-element comprising an element of a first language type and an element of a second language type.

The element of the second language type is an element in a plurality of elements of the second language type corresponding to the element of the first language type.

The so-called first language type and second language type refer to two different language types and may respectively represent a language type of the content to be translated and a language type of a translation result. For example, the first language type is Chinese language, and the second language type is English language; or for another example, the first language type is French language and the second language type is Chinese language.

102: using the at least one knowledge-element to obtain a translation result of the content to be translated.

To so-called content to be translated refers to content to be translated in the translation task of this time, and the language type corresponding to the element is the first language type or the second language type.

It needs to be appreciated that a subject for implementing 101-102 may be an application located at a local terminal, or be a function unit such as a plug-in or Software Development Kit (SDK) arranged in the application located at the local terminal, or be a processing engine located in a network-side server, or be a distributed system located on the network side, for example, a processing engine or a distributed system in a search server on the network side. This is not particularly limited in the present embodiment.

It may be understood that the application may be a native application (nativeAPP) installed on the terminal, or a web application (webAPP) of a browser on the terminal. This is not limited in the present embodiment.

As such, at least one knowledge-element is obtained according to associated information of content to be translated, and the knowledge-element in the at least one knowledge-element comprise an element of a first language type and an element of a second language type so that the at least one knowledge-element can be used to obtain a translation result of the content to be translated. Since the at least one knowledge-element obtained in advance is taken as global information of the translation task of this time, it can be ensured that the translation result of the same content to be translated is consistent, thereby improving the quality of the translation result.

The translation method according to the present disclosure may be adapted for any translation scenario, for example, a scientific and technological document translation scenario, a thesis translation scenario and a simultaneous interpretation scenario in a speech, etc.

Optionally, in a possible implementation of the present embodiment, the associated information of the content to be translated may include but not limited to at least one of the following information:

a language type corresponding to the content to be translated, and a language type corresponding to the translation result of the content to be translated;

title information of the content to be translated;

author information of the content to be translated; and field information of the content to be translated.

Take the simultaneous interpretation in a speech as an example. Before the content to be translated, namely, the element of the speech, is translated, associated information of the speech such as the language type of the speech, the language type after the translation, the title of the speech, a speaker's name, the speaker's workplace and the field of the speech may be first determined.

Figure 4:
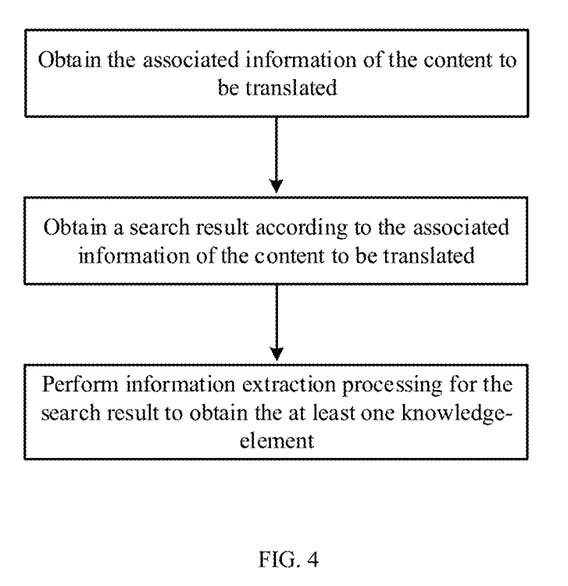
FIG. 4 is a flowchart of obtaining at least one knowledge element according to associated information of content to be translated according to an embodiment of the present disclosure.

Optionally, in a possible implementation of the present embodiment, at 101, it is specifically possible to obtain the associated information of the content to be translated, and then obtain a search result according to the associated information of the content to be translated, and then perform information extraction processing for the search result to obtain the at least one knowledge-element.

Specifically, the associated information of the content to be translated may be used to perform all-network information search to generate a document repository. As such, the document repository includes materials related to the content to be translated. Furthermore, information extraction processing may be further performed for the document repository to obtain the at least one knowledge-element, thereby forming a translation knowledge base as the global information of the translation task of this time.

The procedure of the information extraction processing may include but not limited to a word segmentation process, a noise filtering process, a key word (a term, a name entity or the like) recognition processor and other natural language processing technology processes. This is not particularly limited in the present embodiment. Where bilingual information including the language type of the content to be translated and the language type of the translation result, namely, the element of the first language type and the element of the second language type, can be extracted, the bilingual information may be retained.

Optionally, in a possible implementation of the present embodiment, the knowledge-element obtained at 101 may further comprise a flag for indicating the language type included by the knowledge-element. As such, the knowledge-element each is a triplet <flag, element of the first language type, element of the second language type>. For example, 1 represents two language types, namely, bilingual information; 0 represents one language type, namely, the language type of the content to be translated.

In this implementation, the flag in the knowledge-element make it possible to indicate whether the knowledge-element includes bilingual element, and the flag may be used to quickly determine whether the knowledge-element includes a translation result, thereby effectively improving the use efficiency of the knowledge-element.

Figure 5:
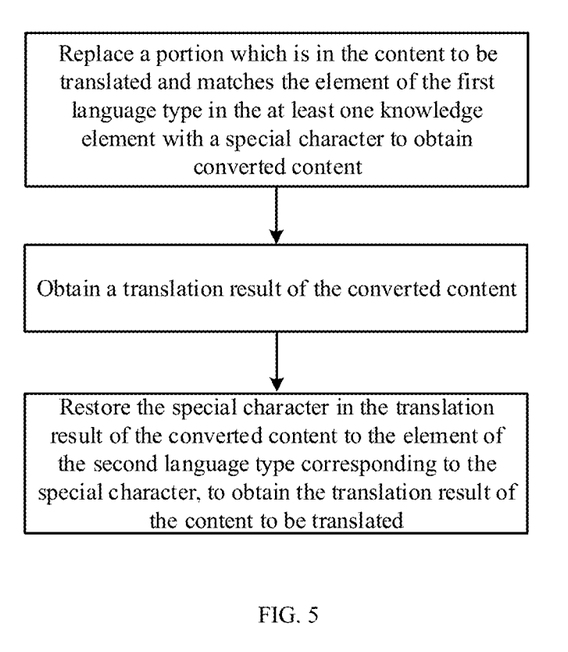
FIG. 5 is a flowchart of using the at least one knowledge element to perform limited decoding processing for the content to be translated to obtain the translation result of the content to be translated according to an embodiment of the present disclosure.

Optionally, in a possible implementation of the present embodiment, at 102, specifically the at least one knowledge-element may be used to perform limited decoding processing for the content to be translated, to obtain the translation result of the content to be translated.

In a specific implementation, specifically it is possible to judge whether a portion which matches the element of the first language type in the at least one knowledge-element exists in the content to be translated. If the portion which matches the element of the first language type in the at least one knowledge-element exists in the content to be translated, judgement is further made as to whether the element of the second language type corresponding to the element of the first language type in the matched at least one knowledge-element exists in the knowledge-element.

If the element of the second language type corresponding to the element of the first language type exists in the matched at least one knowledge-element, the portion which is in the content to be translated and matches the element of the first language type in the at least one knowledge-element may be replaced with a special character to obtain converted content.

Furthermore, it is further possible to record a correspondence relationship between the special character and the existence of the element of the second language type which is in the matched at least one knowledge-element and corresponds to the element of the first language type.

If the element of the second language type corresponding to the element of the first language type does not exist in the matched at least one knowledge-element, the replacement with the special character will not performed any more, and a conventional translation method may be employed to directly obtain the translation result of the content to be translated; alternatively, the portion which is in the content to be translated and matches the element of the first language type in the at least one knowledge-element may still be replaced with a special character to obtain converted content, and the correspondence relationship of the special character may be further recorded as null or other preset mark so that a corresponding measure may be taken subsequently when the special character is restored.

After the converted content with the portion being replaced with the special character is obtained, the conventional translation method may be employed to obtain the translation result of the converted content. The employed translation method may be any method and will not be limited in the present embodiment.

After the translation result of the converted content is obtained, the special character in the translation result of the converted content may be further restored to the element of the second language type corresponding to the special character according to the recorded correspondence relationship, to obtain the translation result of the content to be translated.

For example, the content to be translated is 【我们公司的新产品 智秘书 (our company's new product "intelligent secretary")】. If the conventional translation method is employed, 【"智秘书" (intelligent secretary)】 in the content to be translated 【我们公司的新产品 "智秘书" (our company's new product "intelligent secretary")】 will be translated into 【intelligent secretary】. This will cause the translation result difficult to understand and thereby reduce the translation quality.

Then, according to the technical solution provided by the present disclosure, during recognition of the content to be translated 【我们公司的新产品 "智秘书" (our company's new product "intelligent secretary")】, a pre-obtained translation knowledge base is looked up. If "【"智秘书"】" in the at least one knowledge-element is matched with"【"智秘书"】 in the content to be translated 【我们公司的新产品"智秘书"】 and "xiaozhi" corresponding to "智秘书" exists in the matched at least one knowledge-element, "【"智秘书"】 in the content to be translated 【我们公司的新产品"智秘书"】 may be replaced with a special character to obtain the converted content 【我们公司 的新产品 <KW>】. After the translation result of the converted content 【我们公司 的新产品 <KW>】 is obtained, <KW> therein may be restored to the corresponding "xiaozhi".

After the translation result of the converted content is obtained, if the recorded correspondence relationship of the special character is null or other preset mark, a corresponding measure needs to be taken to perform the restoration processing of the special character, e.g., a transliteration result of the element of the first language type corresponding to the special character is employed for the restoration processing, and the element of the first language type corresponding to the special character is used to look up an emergency vocabulary table of this translation task for the restoration processing.

Figure 6:
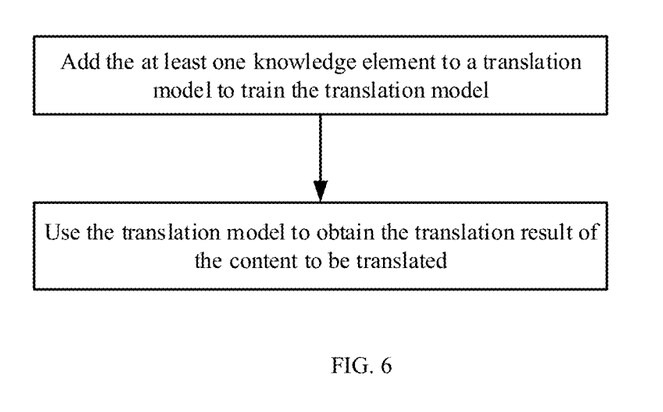
FIG. 6 is a flowchart of using the at least one knowledge element to perform) limited decoding processing for the content to be translated to obtain the translation result of the content to be translated according to an embodiment of the present disclosure.

In another specific implementation, specifically, the at least one knowledge-element may be used to train a translation model, and then the translation model be used to obtain the translation result of the content to be translated.

The so-called translation model is used to convert the element of a language type into the element of another language type. Specifically, a pre-designated training sample set may be employed for training to build the translation model to convert the element of a language type into the element of another language type. The training samples included in the training sample set may be marked known samples so that these known samples may be directly used for training to build the translation model; alternatively, a portion of samples are marked known samples and the remaining portion of samples are unmarked unknown samples; the known samples may be first used for training to build an initial translation model, and the initial translation model is used to evaluate the unknown samples to obtain recognition results, and then the unknown samples may be marked according to the recognition results of the unknown samples to form known samples as newly-added known samples, then the newly-added known samples and the original known samples are used for training again to build a new translation model until the built translation model or known samples satisfy the stop conditions of the translation model, e.g., a recognition accuracy is greater than or equal to a preset accuracy threshold or the number of known samples is greater than or equal to a preset number threshold. This is not particularly limited in the present embodiment.

For example, the at least one knowledge-element may be specifically added to the translation model to train the translation model.

Figure 7:
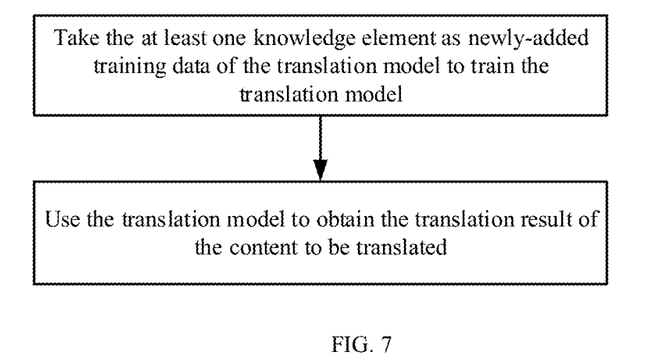
FIG. 7 is a flowchart of using the at least one knowledge element to perform limited decoding processing for the content to be translated to obtain the translation result of the content to be translated according to an embodiment of the present disclosure.

Alternatively, for another example, the at least one knowledge-element may be specifically taken as newly-added training data of the translation model to train the translation model.

In the newly-added training data, a portion may be marked known samples, i.e., the at least one knowledge-element includes the element of two language types, namely, the knowledge-element of the element of the first language type and the element of the second language type, and the remaining portion may be unmarked unknown samples, i.e., the at least one knowledge-element only includes element of one language type, namely, the knowledge-element of the element of the first language type or the element of the second language type. The aforesaid model training method is employed to train the translation model.

In the implementation, the at least one knowledge-element is used to train the translation model, and then the translation model may be used to obtain the translation result of the content to be translated. Since the global information of the translation task of this time is introduced into the translation model, the built translation model can accurately complete output of the specific element of the translation task of this time, thereby further improving the reliability of the translation result.

Optionally, in a possible implementation of the present embodiment, the content to be translated may be text input element, or a speech recognition result, or both the text input element and the speech recognition result. This is not particularly limited in the present embodiment.

In the case where the content to be translated is the speech recognition result, before 102, the at least one knowledge-element may be further used to modify the content to be translated.

Specifically, the portion which is in the content to be translated and matches the element of the first language type in the at least one knowledge-element may be replaced with the element of the first language type to obtain correct content to be translated.

For example, in a speech scenario, speech recognition processing is performed for the element of the speaker's speech, the speech recognition result is 【今天我演讲的题目是"人工智能, 制造未来" (the title of my speech today is "artificial intelligence, the future of manufacture)】. If it is not modified, it is directly regarded as the content to be translated. and the wrong content to be translated 【今天我演讲的题目是"人工 智能, 制造未来"】 will be obtained.

If the technical solution according to the present disclosure is employed, during recognition of the speech recognition result 【今天我演讲的题目是"人工智能, 制造未来"】, 【制造】 in the speech recognition result 【今天我演讲的题目是"人工智能, 制造未来"】 is modified to 】智造 (intelligent manufacture)】 by looking up the pre-obtained translation knowledge base, thereby obtaining the correct content to be translated 【今天我演讲的题目是"人工智能，智造未来"】.

In the implementation, it is possible, by using the at least one knowledge-element to modify the content to be translated, particularly in the speech translation scenario in which the speech recognition result is regarded as the content to be translated, modify the wrong speech recognition result in time before translation, and thereby obtain the correct translation result, and effectively improve the reliability of the translation result.

The code detection method according to the present disclosure ensures the stability of the test code and has the following advantages:

1. The pre-obtained translation knowledge base (namely, the global information of this translation task) may be used to modify the speech recognition result;
2. The pre-obtained translation knowledge base (namely, the global information of this translation task) may be used to modify the translation result;
3. The consistency of the translation result may be ensured, and the intelligibility of the translation result be improved.

In the present embodiment, the at least one knowledge-element is obtained according to associated information of content to be translated, and the knowledge-element in the at least one knowledge-element comprises element of the first language type and element of the second language type so that the at least one knowledge-element can be used to obtain a translation result of the content to be translated. Since the at least one knowledge-element obtained in advance is taken as global information of the translation task of this time, it can be ensured that the translation result of the same content to be translated is consistent, thereby improving the quality of the translation result.

In addition, according to the technical solution provided by the present disclosure, at least one of the language type corresponding to the content to be translated and the language type corresponding to the translation result of the content to be translated, title information, author information and field information of the content to be translated, as the associated information of the content to be translated, is regarded as the basis for building the global information of the translation task of this time, so that the built global information can more thoroughly assist the translation task of this time and the reliability of the translation result can be effectively improved.

In addition, according to the technical solution provided by the present disclosure, it is possible to, by allowing the knowledge-element to further include a flag for indicating the language type included by the knowledge-element, make it possible to indicate whether the knowledge-element includes bilingual element, and effectively improve the use efficiency of the knowledge-element.

In addition, according to the technical solution provided by the present disclosure, it is possible to, by using the at least one knowledge-element to perform limited decoding processing for the content to be translated, obtain the translation result of the content to be translated, operate simply and effectively improve the translation efficiency.

In addition, according to the technical solution provided by the present disclosure, the at least one knowledge-element is used to train the translation model, and then the translation model may be used to obtain the translation result of the content to be translated. Since the global information of the translation task of this time is introduced into the translation model, the built translation model can accurately complete output of the specific element of the translation task of this time, thereby further improving the reliability of the translation result.

In addition, according to the technical solution provided by the present disclosure, it is possible, by using the at least one knowledge-element to modify the content to be translated, particularly in the speech translation scenario in which the speech recognition result is regarded as the content to be translated, modify the wrong speech recognition result in time before translation, and thereby obtain the correct translation result, and effectively improve the reliability of the translation result.

In addition, the user's experience can be effectively improved according to the technical solution provided by the present disclosure.

As appreciated, for ease of description, the aforesaid method embodiments are all described as a combination of a series of actions, but those skilled in the art should appreciated that the present disclosure is not limited to the described order of actions because some steps may be performed in other orders or simultaneously according to the present disclosure. Secondly, those skilled in the art should appreciate the embodiments described in the description all belong to preferred embodiments, and the involved actions and modules are not necessarily requisite for the present disclosure. In the above embodiments, different emphasis is placed on respective embodiments, and reference may be made to related depictions in other embodiments for portions not detailed in a certain embodiment.

Figure 2:
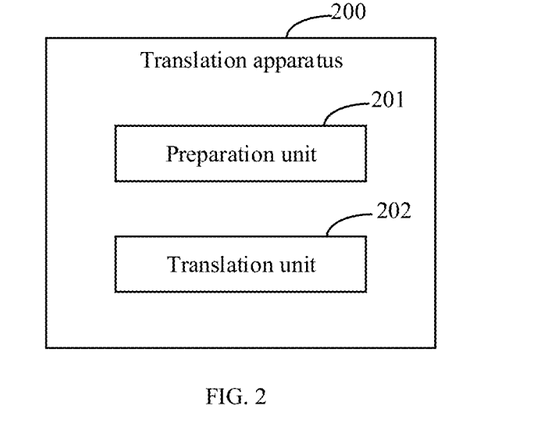
FIG. 2 is a structural schematic diagram of a translation apparatus according to another embodiment of the present disclosure.

FIG. 2 is a structural schematic diagram of a translation apparatus according to another embodiment of the present disclosure. As shown in FIG. 2, the translation apparatus 200 according to the present embodiment may comprise a type preparation unit 201 and a translation unit 202. The type preparation unit 201 is configured to obtain at least one knowledge-element according to associated information of content to be translated, a knowledge-element in the at least one knowledge-element comprising an element of a first language type and an element of a second language type, wherein the element of the second language type is an element in a plurality of elements of the second language type corresponding to the element of the first language type; the translation unit 202 is configured to use the at least one knowledge-element to obtain a translation result of the content to be translated.

It needs to be appreciated that part or all of a subject for performing the translation apparatus according to the present embodiment may be an application located at a local terminal, or be a function unit such as a plug-in or Software Development Kit (SDK) arranged in the application located at the local terminal, or be a processing engine located in a network-side server, or be a distributed system located on the network side, for example, a processing engine or a distributed system in a search server on the network side. This is not particularly limited in the present embodiment.

It may be understood that the application may be a native application (nativeAPP) installed on the terminal, or a web application (webAPP) of a browser on the terminal. This is not limited in the present embodiment.

Optionally, in a possible implementation of the present embodiment, the associated information of the content to be translated may include but not limited to at least one of the following information:

a language type corresponding to the content to be translated, and a language type corresponding to the translation result of the content to be translated;
   title information of the content to be translated;
   author information of the content to be translated; and
   field information of the content to be translated.

Optionally, in a possible implementation of the present embodiment, the preparation unit 201 is specifically configured to obtain the associated information of the content to be translated; obtain a search result according to the associated information of the content to be translated; and perform information extraction processing for the search result to obtain the at least one knowledge-element.

Optionally, in a possible implementation of the present embodiment, the knowledge-element obtained by the preparation unit 201 may further comprise a flag for indicating the language type included by the knowledge-element.

Optionally, in a possible implementation of the present embodiment, the translation unit 202 may specifically use the at least one knowledge-element to perform limited decoding processing for the content to be translated, to obtain the translation result of the content to be translated.

In a specific implementation, the translation unit 202 may specifically be configured to replace a portion which is in the content to be translated and matches the element of the first language type in the at least one knowledge-element with a special character to obtain converted content; obtain a translation result of the converted content; and restore the special character in the translation result of the converted content to the element of the second language type corresponding to the special character, to obtain the translation result of the content to be translated.

In another specific implementation, the translation unit 202 may specifically be configured to use the at least one knowledge-element to train the translation model; and use the translation model to obtain the translation result of the content to be translated.

For example, the translation unit 202 may be specifically configured to add the at least one knowledge-element to the translation model to train the translation model.

Alternatively, for another example, the translation unit 202 may specifically be configured to take the at least one knowledge-element as newly-added training data of the translation model to train the translation model.

Optionally, in a possible implementation of the present embodiment, the translation unit 202 may be further configured to use the at least one knowledge-element to modify the content to be translated.

For example, the translation unit 202 may specifically be configured to replace the portion which is in the content to be translated and matches the element of the first language type in the at least one knowledge-element with the element of the first language type to obtain correct content to be translated.

It needs to be appreciated that the method in the embodiment corresponding to FIG. 1 may be implemented by the translation apparatus provided by the present embodiment. Reference may be made to relevant element in the embodiment corresponding to FIG. 1 for detailed description, and no detailed description will be presented any more here.

In the present embodiment, the preparation unit obtains at least one knowledge-element according to associated information of content to be translated, and the knowledge-element in the at least one knowledge-element comprises element of the first language type and element of the second language type so that the translation unit can use the at least one knowledge-element to obtain a translation result of the content to be translated. Since the at least one knowledge-element obtained in advance is taken as global information of the translation task of this time, it can be ensured that the translation result of the same content to be translated is consistent, thereby improving the quality of the translation result.

In addition, according to the technical solution provided by the present disclosure, at least one of the language type corresponding to the content to be translated and the language type corresponding to the translation result of the content to be translated, title information, author information and field information of the content to be translated, as the associated information of the content to be translated, is regarded as the basis for building the global information of the translation task of this time, so that the built global information can more thoroughly assist the translation task of this time and the reliability of the translation result can be effectively improved.

In addition, according to the technical solution provided by the present disclosure, it is possible to, by allowing the knowledge-element to further include a flag for indicating the language type included by the knowledge-element, make it possible to indicate whether the knowledge-element includes bilingual element, and effectively improve the use efficiency of the knowledge-element.

In addition, according to the technical solution provided by the present disclosure, it is possible to, by using the at least one knowledge-element to perform limited decoding processing for the content to be translated, obtain the translation result of the content to be translated, operate simply and effectively improve the translation efficiency.

In addition, according to the technical solution provided by the present disclosure, the at least one knowledge-element is used to train the translation model, and then the translation model may be used to obtain the translation result of the content to be translated. Since the global information of the translation task of this time is introduced into the translation model, the built translation model can accurately complete output of the specific element of the translation task of this time, thereby further improving the reliability of the translation result.

In addition, according to the technical solution provided by the present disclosure, it is possible, by using the at least one knowledge-element to modify the content to be translated, particularly in the speech translation scenario in which the speech recognition result is regarded as the content to be translated, modify the wrong speech recognition result in time before translation, and thereby obtain the correct translation result, and effectively improve the reliability of the translation result.

In addition, the user's experience can be effectively improved according to the technical solution provided by the present disclosure.

According to an embodiment of the present disclosure, the present disclosure further provides an electronic device and a non-transitory computer-readable storage medium storing computer instructions therein.

Figure 3:
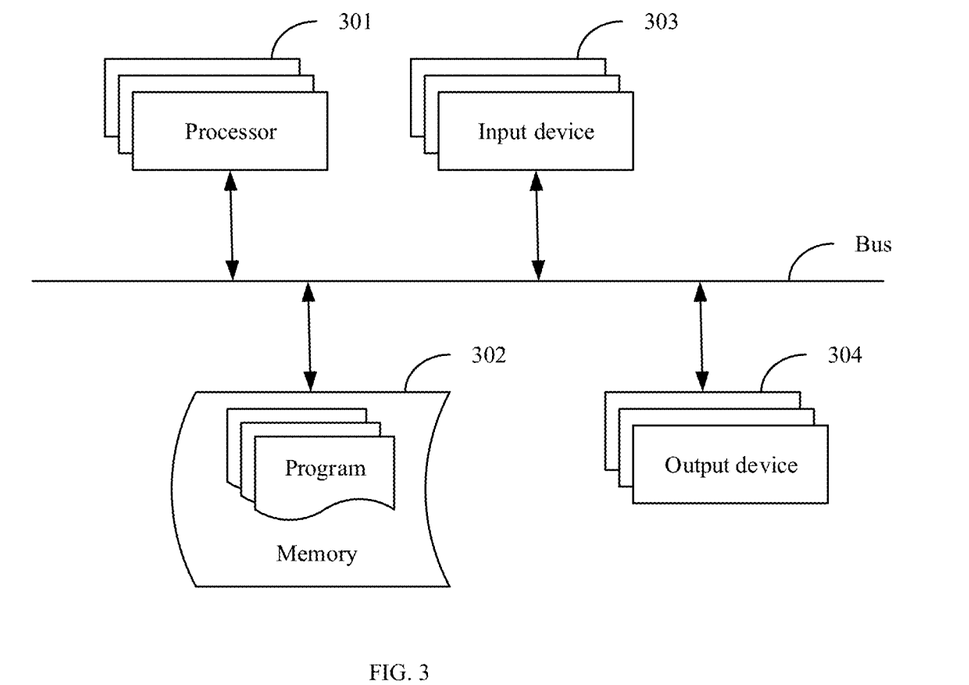
FIG. 3 is a schematic diagram of an electronic device for implementing a translation method according to an embodiment of the present disclosure.

As shown in FIG. 3, it shows a schematic diagram of an electronic device for implementing the translation method according to an embodiment of the present disclosure. The electronic device is intended to represent various forms of digital computers, such as laptops, desktops, workstations, personal digital assistants, servers, blade servers, mainframes, and other appropriate computers. The electronic device is further intended to represent various forms of mobile devices, such as personal digital assistants, cellular telephones, smartphones, wearable devices and other similar computing devices. The components shown here, their connections and relationships, and their functions, are meant to be exemplary only, and are not meant to limit implementations of the inventions described and/or claimed in the text here.

As shown in FIG. 3, the electronic device comprises: one or more processors 301, a memory 302, and interfaces connected to components and including a high-speed interface and a low speed interface. Each of the components are interconnected using various busses, and may be mounted on a common motherboard or in other manners as appropriate. The processor can process instructions for execution within the electronic device, including instructions stored in the memory or on the storage device to display graphical information for a GUI on an external input/output device, such as display coupled to the interface. In other implementations, multiple processors and/or multiple buses may be used, as appropriate, along with multiple memories and types of memory. Also, multiple electronic devices may be connected, with each device providing portions of the necessary operations (e.g., as a server bank, a group of blade servers, or a multi-processor system). One processor 301 is taken as an example in FIG. 3.

The memory 302 is a non-transitory computer-readable storage medium provided by the present disclosure. Wherein, the memory stores instructions executable by at least one processor, so that the at least one processor executes the data query method provided in the present disclosure. The non-transitory computer-readable storage medium of the present disclosure stores computer instructions, which are used to cause a computer to execute the data query method provided by the present disclosure.

The memory 302 is a non-transitory computer-readable storage medium and can be used to store non-transitory software programs, non-transitory computer executable programs and units, such as program instructions/units corresponding to the translation method in the embodiments of the present disclosure (for example, the preparation unit 201 and translation unit 202 as shown in FIG. 2). The processor 301 executes various functional applications and data processing of the server, i.e., implements the translation method stated in the above method embodiments, by running the non-transitory software programs, instructions and units stored in the memory 302.

The memory 302 may include a storage program region and a storage data region, wherein the storage program region may store an operating system and an application program needed by at least one function; the storage data region may store data created according to the use of the electronic device for implementing the translation method according to the embodiments of the present disclosure. In addition, the memory 302 may include a high-speed random access memory, and may also include a non-transitory memory, such as at least one magnetic disk storage device, a flash memory device, or other non-transitory solid-state storage device. In some embodiments, the memory 302 may optionally include a memory remotely arranged relative to the processor 301, and these remote memories may be connected to the electronic device for implementing the translation method according to embodiments of the present disclosure through a network. Examples of the above network include, but are not limited to, the Internet, an intranet, a local area network, a mobile communication network, and combinations thereof.

The electronic device for the translation method may further include an input device 303 and an output device 304. The processor 301, the memory 302, the input device 303 and the output device 304 may be connected through a bus or in other manners. In FIG. 3, the connection through the bus is taken as an example.

The input device 303 may receive inputted numeric or character information and generate key signal inputs related to user settings and function control of the electronic device for the translation method, and may be an input device such as a touch screen, keypad, mouse, trackpad, touchpad, pointing stick, one or more mouse buttons, trackball and joystick. The output device 304 may include a display device, an auxiliary lighting device (e.g., an LED), a haptic feedback device (for example, a vibration motor), etc. The display device may include but not limited to a Liquid Crystal Display (LCD), a Light Emitting Diode (LED) display, and a plasma display. In some embodiments, the display device may be a touch screen.

Various implementations of the systems and techniques described here may be realized in digital electronic circuitry, integrated circuitry, specially designed ASICs (Application Specific Integrated Circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the terms "machine-readable medium" and "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback);

and input from the user may be received in any form, including acoustic, speech, or tactile input.

The systems and techniques described here may be implemented in a computing system that includes a back end component (e.g., as a data server), or that includes a middleware component (e.g., an application server), or that includes a front end component (e.g., a client computer having a graphical user interface or a Web browser through which a user may interact with an implementation of the systems and techniques described here), or any combination of such back end, middleware, or front end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

In the technical solution according to the present disclosure, the at least one knowledge-element is obtained according to associated information of content to be translated, and the knowledge-element in the at least one knowledge-element comprises an element of the first language type and an element of the second language type so that the at least one knowledge-element can be used to obtain a translation result of the content to be translated. Since the at least one knowledge-element obtained in advance is taken as global information of the translation task of this time, it can be ensured that the translation result of the same content to be translated is consistent, thereby improving the quality of the translation result.

In addition, according to the technical solutions provided by the present disclosure, at least one of the language type corresponding to the content to be translated and the language type corresponding to the translation result of the content to be translated, title information, author information and field information of the content to be translated, as the associated information of the content to be translated, is regarded as the basis for building the global information of the translation task of this time, so that the built global information can more thoroughly assist the translation task of this time and the reliability of the translation result can be effectively improved.

In addition, according to the technical solutions provided by the present disclosure, it is possible to, by allowing the knowledge-element to further include a flag for indicating the language type included by the knowledge-element, make it possible to indicate whether the knowledge-element includes bilingual element, and effectively improve the use efficiency of the knowledge-element.

In addition, according to the technical solutions provided by the present disclosure, it is possible to, by using the at least one knowledge-element to perform limited decoding processing for the content to be translated, obtain the translation result of the content to be translated, operate simply and effectively improve the translation efficiency.

In addition, according to the technical solution provided by the present disclosure, the at least one knowledge-element is used to train the translation model, and then the translation model may be used to obtain the translation result of the content to be translated. Since the global information of the translation task of this time is introduced into the translation model, the built translation model can accurately complete output of the specific element of the translation task of this time, thereby further improving the reliability of the translation result.

In addition, according to the technical solutions provided by the present disclosure, it is possible, by using the at least one knowledge-element to modify the content to be translated, particularly in the speech translation scenario in which the speech recognition result is regarded as the content to be translated, modify the wrong speech recognition result in time before translation, and thereby obtain the correct translation result, and effectively improve the reliability of the translation result.

In addition, the user's experience can be effectively improved according to the technical solutions provided by the present disclosure.

It should be understood that the various forms of processes shown above can be used to reorder, add, or delete steps. For example, the steps described in the present disclosure can be performed in parallel, sequentially, or in different orders as long as the desired results of the technical solutions disclosed in the present disclosure can be achieved, which is not limited herein.

The foregoing specific implementations do not constitute a limitation on the protection scope of the present disclosure. It should be understood by those skilled in the art that various modifications, combinations, sub-combinations and substitutions can be made according to design requirements and other factors. Any modification, equivalent replacement and improvement made within the spirit and principle of the present disclosure shall be included in the protection scope of the present disclosure.

What is claimed is:

1. A computer-implemented translation method, comprising:
    obtaining at least one knowledge-element according to associated information of content to be translated, a knowledge-element in the at least one knowledge-element being in a form of a triple comprising an element of a first language, an element of a second language and a flag indicating the language type included in the knowledge-element, wherein the element of the second language is an element in a plurality of elements of the second language corresponding to the element of the first language;
    determining whether the knowledge element includes a translation result of the element of the first language based on the flag;
    using the at least one knowledge-element and the determination based on the flag to obtain a translation result of the content to be translated,
    wherein obtaining the translation result of the content to be translated comprises:
    using the at least one knowledge-element and a trained translation model to perform limited decoding processing for the content to be translated, to obtain the translation result of the content to be translated, wherein the limited decoding limits the output of translation to include a particular result depending on the at least one knowledge element,
    wherein the using of the at least one knowledge-element and a trained translation model to perform limited decoding processing for the content to be translated, to obtain the translation result of the content to be translated comprises:
    replacing a portion which is in the content to be translated and matches the element of the first language in the at least one knowledge-element with a special character to obtain converted content;
    recording a correspondence relationship between the special character and the existence of the element of the second language which is in the matched at least one knowledge element and corresponds to the element of the first language;
    obtaining a translation result of the converted content; and
    restoring the special character in the translation result of the converted content to the element of the second language corresponding to the special character according to the recorded correspondence relationship without any translation process, to obtain a final translation result of the content to be translated.

2. The method according to claim 1, wherein the associated information of the content to be translated includes at least one of the following information:
   a language corresponding to the content to be translated, and a language corresponding to the translation result of the content to be translated;
   title information of the content to be translated;
   author information of the content to be translated; and
   field information of the content to be translated.

3. The method according to claim 1, wherein the obtaining at least one knowledge-element according to associated information of content to be translated comprises:
   obtaining the associated information of the content to be translated;
   obtaining a search result according to the associated information of the content to be translated; and
   performing information extraction processing for the search result to obtain the at least one knowledge-element.

4. The method according to claim 1, wherein the using of the at least one knowledge-element and a trained translation model to perform limited decoding processing for the content to be translated, to obtain the translation result of the content to be translated comprises:
   adding the at least one knowledge-element to a translation model to train the translation model; and
   using the trained translation model to obtain the translation result of the content to be translated.

5. The method according to claim 1, wherein the using of the at least one knowledge-element and a trained translation model to perform limited decoding processing for the content to be translated, to obtain the translation result of the content to be translated comprises:
   taking the at least one knowledge-element as newly-added training data of the translation model to train the translation model;
   using the trained translation model to obtain the translation result of the content to be translated.

6. The method according to claim 1, wherein before using the at least one knowledge-element to obtain a translation result of the content to be translated, the method further comprises:
   using the at least one knowledge-element to modify the content to be translated.

7. The method according to claim 6, wherein the using of the at least one knowledge-element to modify the content to be translated comprises:
   replacing a portion which is in the content to be translated and matches the element of the first language in the at least one knowledge-element with the element of the first language, to obtain correct content to be translated.

8. An electronic device, comprising
   at least one processor; and
   a memory communicatively connected with the at least one processor;
   wherein the memory stores instructions executable by the at least one processor, and the instructions are executed by the at least one processor to enable the at least one processor to perform a translation method, comprising:
   obtaining at least one knowledge-element according to associated information of content to be translated, a knowledge-element in the at least one knowledge-element being in a form of a triple comprising an element of a first language, an element of a second language and a flag indicating the language type included in the knowledge-element, wherein the element of the second language is an element in a plurality of elements of the second language corresponding to the element of the first language;
   determining whether the knowledge element includes a translation result of the element of the first language based on the flag;
   using the at least one knowledge-element and the determination based on the flag to obtain a translation result of the content to be translated,
   wherein obtaining the translation result of the content to be translated comprises:
   using the at least one knowledge-element and a trained translation model to perform limited decoding processing for the content to be translated, to obtain the translation result of the content to be translated, wherein the limited decoding limits the output of translation to include a particular result depending on the at least one knowledge element,
   wherein the using of the at least one knowledge-element and a trained translation model to perform limited decoding processing for the content to be translated, to obtain the translation result of the content to be translated comprises:
   replacing a portion which is in the content to be translated and matches the element of the first language in the at least one knowledge-element with a special character to obtain converted content;
   recording a correspondence relationship between the special character and the existence of the element of the second language which is in the matched at least one knowledge element and corresponds to the element of the first language;
   obtaining a translation result of the converted content; and
   restoring the special character in the translation result of the converted content to the element of the second language corresponding to the special character according to the recorded correspondence relationship without any translation process, to obtain a final translation result of the content to be translated.

9. The electronic device according to claim 8, wherein the associated information of the content to be translated includes at least one of the following information:
   a language corresponding to the content to be translated, and a language corresponding to the translation result of the content to be translated;
   title information of the content to be translated;
   author information of the content to be translated; and
   field information of the content to be translated.

10. The electronic device according to claim 8, wherein the obtaining at least one knowledge-element according to associated information of content to be translated comprises:
    obtaining the associated information of the content to be translated;
    obtaining a search result according to the associated information of the content to be translated; and
    performing information extraction processing for the search result to obtain the at least one knowledge-element.

11. The electronic device according to claim 8, wherein the using of the at least one knowledge-element and a trained translation model to perform limited decoding processing for the content to be translated, to obtain the translation result of the content to be translated comprises:
    adding the at least one knowledge-element to a translation model to train the translation model; and using the trained translation model to obtain the translation result of the content to be translated.

12. The electronic device according to claim 8, wherein the using of the at least one knowledge-element and a trained translation model to perform limited decoding processing for the content to be translated, to obtain the translation result of the content to be translated comprises:

taking the at least one knowledge-element as newly-added training data of the translation model to train the translation model;

using the trained translation model to obtain the translation result of the content to be translated.

13. The electronic device according to claim 8, wherein before using the at least one knowledge-element to obtain a translation result of the content to be translated, the method further comprises:

using the at least one knowledge-element to modify the content to be translated.

14. A non-transitory computer-readable storage medium storing computer instructions therein, wherein the computer instructions are used to cause the computer to perform a translation method, comprising:

obtaining at least one knowledge-element according to associated information of content to be translated, respective knowledge-element in the at least one knowledge-element being in a form of a triple comprising an element of a first language, an element of a second language and a flag indicating the language type included in the knowledge-element, wherein the element of the second language is an element in a plurality of elements of the second language corresponding to the element of the first language;

determining whether the knowledge element includes a translation result of the element of the first language based on the flag;

using the at least one knowledge-element and the determination based on the flag to obtain a translation result of the content to be translated, wherein obtaining the translation result of the content to be translated comprises:

using the at least one knowledge-element and a trained translation model to perform limited decoding processing for the content to be translated, to obtain the translation result of the content to be translated, wherein the limited decoding limits the output of translation to include a particular result depending on the at least one knowledge element, wherein the using of the at least one knowledge-element and a trained translation model to perform limited decoding processing for the content to be translated, to obtain the translation result of the content to be translated comprises:

replacing a portion which is in the content to be translated and matches the element of the first language in the at least one knowledge-element with a special character to obtain converted content;

recording a correspondence relationship between the special character and the existence of the element of the second language which is in the matched at least one knowledge element and corresponds to the element of the first language;

obtaining a translation result of the converted content; and restoring the special character in the translation result of the converted content to the element of the second language corresponding to the special character according to the recorded correspondence relationship without any translation process, to obtain a final translation result of the content to be translated.

\* \* \* \* \*